(12) United States Patent  (10) Patent No.: US 7,450,794 B2
Gorrell et al.  (45) Date of Patent: Nov. 11, 2008

(54) MICROCIRCUIT USING ELECTROMAGNETIC WAVE ROUTING

(75) Inventors: Jonathan Gorrell, Gainesville, FL (US); Mark Davidson, Florahome, FL (US)

(73) Assignee: Virgin Islands Microsystems, Inc., St. Thomas (VG)

( * ) Notice: Subject to any disclaimer, the term of this patent is extended or adjusted under 35 U.S.C. 154(b) by 0 days.

(21) Appl. No.: 11/522,929

(22) Filed: Sep. 19, 2006

(65) Prior Publication Data

US 2008/0069509 A1 Mar. 20, 2008

(51) Int. Cl.
*G02B 6/12* (2006.01)
*G02B 6/10* (2006.01)

(52) U.S. Cl. .......................................... 385/14; 385/130

(58) Field of Classification Search .................... 385/14, 385/130
See application file for complete search history.

(56) References Cited

U.S. PATENT DOCUMENTS

| | | | |
|---|---|---|---|
| 1,948,384 A | 2/1934 | Lawrence | |
| 2,307,086 A | 1/1943 | Varian et al. | |
| 2,431,396 A | 11/1947 | Hansell | |
| 2,473,477 A | 6/1949 | Smith | |
| 2,634,372 A | 4/1953 | Salisbury | |
| 2,932,798 A | 4/1960 | Kerst et al. | |
| 3,571,642 A | 3/1971 | Westcott | |
| 3,761,828 A | 9/1973 | Pollard et al. | |
| 3,923,568 A | 12/1975 | Bersin | |
| 3,989,347 A | 11/1976 | Eschler | |
| 4,282,436 A | 8/1981 | Kapetanakos | |
| 4,482,779 A | 11/1984 | Anderson | |
| 4,727,550 A | 2/1988 | Chang et al. | |
| 4,740,973 A | 4/1988 | Madey | |
| 4,746,201 A | 5/1988 | Gould | |
| 4,829,527 A | 5/1989 | Wortman et al. | |
| 4,838,021 A | 6/1989 | Beattie | |
| 5,023,563 A | 6/1991 | Harvey et al. | |
| 5,157,000 A | 10/1992 | Elkind et al. | |
| 5,163,118 A * | 11/1992 | Lorenzo et al. ............. | 385/132 |

(Continued)

FOREIGN PATENT DOCUMENTS

EP 0237559 B1 12/1991

(Continued)

OTHER PUBLICATIONS

Lee Kwang-Cheol et al., "Deep X-Ray Mask with Integrated Actuator for 3D Microfabrication", Conference: Pacific Rim Workshop on Transducers and Micro/Nano Technologies, (Xiamen CHN), Jul. 22, 2002.

(Continued)

*Primary Examiner*—K. Cyrus Kianni
(74) *Attorney, Agent, or Firm*—Davidson Berquist Jackson & Gowdey LLP

(57) ABSTRACT

A device includes a transparent conductor formed on a substrate. Electromagnetic radiation (EMR) (such as may be received from an on-chip, ultra-small resonant structure or from an off-chip light source) is directed into the transparent conductive layer. One or more circuits are formed on the transparent conductive layer and are operatively connected thereto to receive at least a portion of the EMR traveling in the transparent conductor. The EMR may be light and may encode a data signal such as a clock signal.

16 Claims, 5 Drawing Sheets

U.S. PATENT DOCUMENTS

| | | | |
|---|---|---|---|
| 5,185,073 A | 2/1993 | Bindra | |
| 5,199,918 A | 4/1993 | Kumar | |
| 5,262,656 A | 11/1993 | Blondeau et al. | |
| 5,263,043 A | 11/1993 | Walsh | |
| 5,268,693 A | 12/1993 | Walsh | |
| 5,268,788 A | 12/1993 | Fox et al. | |
| 5,302,240 A | 4/1994 | Hori et al. | |
| 5,354,709 A * | 10/1994 | Lorenzo et al. | 117/8 |
| 5,446,814 A | 8/1995 | Kuo et al. | |
| 5,608,263 A | 3/1997 | Drayton et al. | |
| 5,668,368 A | 9/1997 | Sakai et al. | |
| 5,705,443 A | 1/1998 | Stauf et al. | |
| 5,737,458 A | 4/1998 | Wojnarowski et al. | |
| 5,744,919 A | 4/1998 | Mishin et al. | |
| 5,757,009 A | 5/1998 | Walstrom | |
| 5,767,013 A | 6/1998 | Park | |
| 5,790,585 A | 8/1998 | Walsh | |
| 5,811,943 A | 9/1998 | Mishin et al. | |
| 5,821,836 A | 10/1998 | Katehi et al. | |
| 5,821,902 A | 10/1998 | Keen | |
| 5,831,270 A | 11/1998 | Nakasuji | |
| 5,847,745 A | 12/1998 | Shimizu et al. | |
| 5,889,449 A * | 3/1999 | Fiedziuszko | 333/239 |
| 5,902,489 A | 5/1999 | Yasuda et al. | |
| 6,008,496 A | 12/1999 | Winefordner et al. | |
| 6,040,625 A | 3/2000 | Ip | |
| 6,060,833 A | 5/2000 | Velazco | |
| 6,080,529 A | 6/2000 | Ye et al. | |
| 6,195,199 B1 | 2/2001 | Yamada | |
| 6,222,866 B1 | 4/2001 | Seko | |
| 6,281,769 B1 * | 8/2001 | Fiedziuszko | 333/239 |
| 6,297,511 B1 | 10/2001 | Syllaios et al. | |
| 6,338,968 B1 * | 1/2002 | Hefti | 436/518 |
| 6,370,306 B1 | 4/2002 | Sato et al. | |
| 6,373,194 B1 | 4/2002 | Small | |
| 6,376,258 B2 * | 4/2002 | Hefti | 436/518 |
| 6,407,516 B1 | 6/2002 | Victor | |
| 6,441,298 B1 | 8/2002 | Thio | |
| 6,504,303 B2 | 1/2003 | Small | |
| 6,545,425 B2 | 4/2003 | Victor | |
| 6,577,040 B2 | 6/2003 | Nguyen | |
| 6,603,915 B2 | 8/2003 | Glebov et al. | |
| 6,624,916 B1 | 9/2003 | Green et al. | |
| 6,636,653 B2 | 10/2003 | Miracky et al. | |
| 6,642,907 B2 | 11/2003 | Hamada et al. | |
| 6,738,176 B2 | 5/2004 | Rabinowitz et al. | |
| 6,741,781 B2 | 5/2004 | Furuyama | |
| 6,782,205 B2 | 8/2004 | Trisnadi et al. | |
| 6,791,438 B2 | 9/2004 | Takahashi et al. | |
| 6,829,286 B1 | 12/2004 | Guilfoyle et al. | |
| 6,834,152 B2 * | 12/2004 | Gunn et al. | 385/130 |
| 6,870,438 B1 * | 3/2005 | Shino et al. | 333/26 |
| 6,885,262 B2 | 4/2005 | Nishimura et al. | |
| 6,909,092 B2 | 6/2005 | Nagahama | |
| 6,909,104 B1 | 6/2005 | Koops | |
| 6,944,369 B2 * | 9/2005 | Deliwala | 385/30 |
| 6,953,291 B2 | 10/2005 | Liu | |
| 6,965,625 B2 | 11/2005 | Mross et al. | |
| 6,995,406 B2 | 2/2006 | Tojo et al. | |
| 7,010,183 B2 * | 3/2006 | Estes et al. | 385/14 |
| 7,092,588 B2 | 8/2006 | Kondo | |
| 7,092,603 B2 | 8/2006 | Glebov et al. | |
| 7,122,978 B2 | 10/2006 | Nakanishi et al. | |
| 7,177,515 B2 * | 2/2007 | Estes et al. | 385/130 |
| 7,267,459 B2 | 9/2007 | Matheson | |
| 7,267,461 B2 | 9/2007 | Kan et al. | |
| 2001/0025925 A1 | 10/2001 | Abe et al. | |
| 2002/0009723 A1 * | 1/2002 | Hefti | 435/6 |
| 2002/0027481 A1 * | 3/2002 | Fiedziuszko | 333/116 |
| 2002/0036264 A1 | 3/2002 | Nakasuji et al. | |
| 2002/0053638 A1 | 5/2002 | Winkler et al. | |
| 2002/0135665 A1 | 9/2002 | Gardner | |
| 2003/0012925 A1 | 1/2003 | Gorrell | |
| 2003/0016412 A1 | 1/2003 | Small | |
| 2003/0016421 A1 | 1/2003 | Small | |
| 2003/0034535 A1 | 2/2003 | Barenburu et al. | |
| 2003/0155521 A1 | 8/2003 | Feuerbaum | |
| 2003/0164947 A1 | 9/2003 | Vaupel | |
| 2003/0179974 A1 * | 9/2003 | Estes et al. | 385/2 |
| 2003/0206708 A1 * | 11/2003 | Estes et al. | 385/130 |
| 2003/0214695 A1 | 11/2003 | Abramson et al. | |
| 2004/0061053 A1 | 4/2004 | Taniguchi et al. | |
| 2004/0108473 A1 | 6/2004 | Melnychuk et al. | |
| 2004/0136715 A1 | 7/2004 | Kondo | |
| 2004/0150991 A1 | 8/2004 | Ouderkirk et al. | |
| 2004/0171272 A1 | 9/2004 | Jin et al. | |
| 2004/0180244 A1 | 9/2004 | Tour et al. | |
| 2004/0213375 A1 | 10/2004 | Bjorkholm et al. | |
| 2004/0217297 A1 | 11/2004 | Moses et al. | |
| 2004/0231996 A1 | 11/2004 | Webb | |
| 2004/0240035 A1 | 12/2004 | Zhilkov | |
| 2004/0264867 A1 | 12/2004 | Kondo | |
| 2005/0023145 A1 | 2/2005 | Cohen et al. | |
| 2005/0045821 A1 | 3/2005 | Noji et al. | |
| 2005/0054151 A1 | 3/2005 | Lowther et al. | |
| 2005/0067286 A1 | 3/2005 | Ahn et al. | |
| 2005/0082469 A1 | 4/2005 | Carlo | |
| 2005/0092929 A1 | 5/2005 | Schneiker | |
| 2005/0105690 A1 | 5/2005 | Pau et al. | |
| 2005/0145882 A1 * | 7/2005 | Taylor et al. | 257/192 |
| 2005/0162104 A1 | 7/2005 | Victor et al. | |
| 2005/0190637 A1 | 9/2005 | Ichimura et al. | |
| 2005/0194258 A1 | 9/2005 | Cohen et al. | |
| 2005/0201707 A1 | 9/2005 | Glebov et al. | |
| 2005/0201717 A1 | 9/2005 | Matsumura et al. | |
| 2005/0212503 A1 | 9/2005 | Deibele | |
| 2005/0249451 A1 * | 11/2005 | Baehr-Jones et al. | 385/14 |
| 2006/0007730 A1 | 1/2006 | Nakamura et al. | |
| 2006/0018619 A1 | 1/2006 | Helffrich et al. | |
| 2006/0035173 A1 | 2/2006 | Davidson et al. | |
| 2006/0045418 A1 | 3/2006 | Cho et al. | |
| 2006/0060782 A1 | 3/2006 | Khursheed | |
| 2006/0062258 A1 | 3/2006 | Brau et al. | |
| 2006/0159131 A1 | 7/2006 | Liu et al. | |
| 2006/0164496 A1 | 7/2006 | Tokutake et al. | |
| 2006/0208667 A1 | 9/2006 | Lys et al. | |
| 2006/0274922 A1 | 12/2006 | Ragsdale | |
| 2007/0003781 A1 * | 1/2007 | de Rochemont | 428/615 |
| 2007/0013765 A1 | 1/2007 | Hudson et al. | |
| 2007/0075264 A1 | 4/2007 | Gorrell et al. | |
| 2007/0086915 A1 | 4/2007 | LeBoeuf et al. | |
| 2007/0116420 A1 * | 5/2007 | Estes et al. | 385/130 |

FOREIGN PATENT DOCUMENTS

| | | |
|---|---|---|
| JP | 2004-32323 A | 1/2004 |
| WO | WO 87/01873 | 3/1987 |
| WO | WO 93/21663 A1 | 10/1993 |
| WO | WO 00/72413 | 11/2000 |
| WO | WO 02/25785 | 3/2002 |
| WO | WO 02/077607 | 10/2002 |
| WO | WO 2004/086560 | 10/2004 |
| WO | WO 2005/015143 A2 | 2/2005 |
| WO | WO 2006/042239 A2 | 4/2006 |

OTHER PUBLICATIONS

Markoff, John, "A Chip That Can Transfer Data Using Laser Light," The New York Times, Sep. 18, 2006.

S.M. Sze, "Semiconductor Devices Physics and Technology", 2nd Edition, Chapters 9 and 12, Copyright 1985, 2002.

Search Report and Written Opinion mailed Feb. 12, 2007 in PCT Appln. No. PCT/US2006/022682.

Search Report and Written Opinion mailed Feb. 20, 2007 in PCT Appln. No. PCT/US2006/022676.

Search Report and Written Opinion mailed Feb. 20, 2007 in PCT Appln. No. PCT/US2003/022772.
Search Report and Written Opinion mailed Feb. 20, 2007 in PCT Appln. No. PCT/US2006/022780.
Search Report and Written Opinion mailed Feb. 21, 2007 in PCT Appln. No. PCT/US2006/022684.
Search Report and Written Opinion mailed Jan. 17, 2007 in PCT Appln. No. PCT/US2006/022777.
Search Report and Written Opinion mailed Jan. 23, 2007 in PCT Appln. No. PCT/US2006/022781.
Search Report and Written Opinion mailed Mar. 7, 2007 in PCT Appln. No. PCT/US2006/022775.
Speller et al., "A Low-Noise MEMS Accelerometer for Unattended Ground Sensor Applications", Applied MEMS Inc., 12200 Parc Crest, Stafford, TX, USA 77477.
Thurn-Albrecht et al., "Ultrahigh-Density Nanowire Arrays Grown in Self-Assembled Diblock Copolymer Templates", Science 290. 5499, Dec. 15, 2000, pp. 2126-2129.
International Search Report and Written Opinion mailed Nov. 23, 2007 in International Application No. PCT/US2006/022786.
Search Report and Written Opinion mailed Oct. 25, 2007 in PCT Appln. No. PCT/US2006/022687.
Search Report and Written Opinion mailed Oct. 26, 2007 in PCT Appln. No. PCT/US2006/022675.
Search Report and Written Opinion mailed Sep. 21, 2007 in PCT Appln. No. PCT/US2006/022688.
Search Report and Written Opinion mailed Sep. 25, 2007 in PCT appln. No. PCT/US2006/022681.
Search Report and Written Opinion mailed Sep. 26, 2007 in PCT Appln. No. PCT/US2006/024218.
J. C. Palais, "Fiber optic communications," Prentice Hall, New Jersey, 1998, pp. 156-158.
Search Report and Written Opinion mailed Dec. 20, 2007 in PCT Appln. No. PCT/US2006/022771.
Search Report and Written Opinion mailed Jan. 31, 2008 in PCT Appln. No. PCT/US2006/027427.
Search Report and Written Opinion mailed Jan. 8, 2008 in PCT Appln. No. PCT/US2006/028741.
Search Report and Written Opinion mailed Mar. 11, 2008 in PCT Appln. No. PCT/US2006/022679.
Search Report and Written Opinion mailed Aug. 24, 2007 in PCT Appln. No. PCT/US2006/022768.
Search Report and Written Opinion mailed Aug. 31, 2007 in PCT Appln. No. PCT/US2006/022680.
Search Report and Written Opinion mailed Jul. 16, 2007 in PCT Appln. No. PCT/US2006/022774.
Search Report and Written Opinion mailed Jul. 20, 2007 in PCT Appln. No. PCT/US2006/024216.
Search Report and Written Opinion mailed Jul. 26, 2007 in PCT Appln. No. PCT/US2006/022776
Search Report and Written Opinion mailed Jun 20, 2007 in PCT Appln. No. PCT/US2006/022779.
Search Report and Written Opinion mailed Sep. 12, 2007 in PCT Appln. No. PCT/US2006/022767.
Search Report and Written Opinion mailed Sep. 13, 2007 in PCT Appln. No. PCT/US2006/024217.
Search Report and Written Opinion mailed Sep. 17, 2007 in PCT Appln. No. PCT/US2006/022787.
Search Report and Written Opinion mailed Sep. 5, 2007 in PCT Appln. No. PCT/US2006/027428.
Search Report and Written Opinion mailed Sep. 17, 2007 in PCT Appln. No. PCT/US2006/022689.
"Array of Nanoklystrons for Frequency Agility or Redundancy," NASA's Jet Propulsion Laboratory, NASA Tech Briefs, NPO-21033. 2001.
"Hardware Development Programs," Calabazas Creek Research, Inc. found at http://calcreek.com/hardware.html.
"Antenna Arrays." May 18, 2002. www.tpub.com/content/neets/14183/css/14183_159.htm.
"Diffraction Grating," hyperphysics.phy-astr.gsu.edu/hbase/phyopt/grating.html.

Alford, T.L. et al., "Advance silver-based metallization patterning for ULSI applications," Microelectronic Engineering 55, 2001, pp. 383-388, Elsevier Science B.V.
Amato, Ivan, "An Everyman's Free-Electron Laser?" Science, New Series, Oct. 16, 1992, p. 401, vol. 258 No. 5081, American Association for the Advancement of Science.
Andrews, H.L. et al., "Dispersion and Attenuation in a Smith-Purcell Free Electron Laser," The American Physical Society, Physical Review Special Topics—Accelerators and Beams 8 (2005), pp. 050703-1-050703-9.
Backe, H. et al. "Investigation of Far-Infrared Smith-Purcell Radiation at the 3.41 MeV Electron Injector Linac of the Mainz Microtron MAMI," Institut fur Kernphysik, Universitat Mainz, D-55099, Mainz Germany.
Bakhtyari, A. et al., "Horn Resonator Boosts Miniature Free-Electron Laser Power," Applied Physics Letters, May 12, 2003, pp. 3150-3152, vol. 82, No. 19, American Institute of Physics.
Bakhtyari, Dr. Arash, "Gain Mechanism in a Smith-Purcell MicroFEL," Abstract, Department of Physics and Astronomy, Dartmouth College.
Bhattacharjee, Sudeep et al., "Folded Waveguide Traveling-Wave Tube Sources for Terahertz Radiation," IEEE Transactions on Plasma Science, vol. 32, No. 3, Jun. 2004, pp. 1002-1014.
Booske, J.H. et al., "Microfabricated TWTs as High Power, Wideband Sources of THz Radiation".
Brau, C.A. et al., "Gain and Coherent Radiation from a Smith-Purcell Free Electron Laser," Proceedings of the 2004 FEL Conference, pp. 278-281.
Brownell, J.H. et al., "Improved μFEL Performance with Novel Resonator," Jan. 7, 2005, from website: www.frascati.enea.it/thz-bridge/workshop/presentations/Wednesday/We-07-Brownell.ppt.
Brownell, J.H. et al., "The Angular Distribution of the Power Produced by Smith-Purcell Radiation," J. Phys. D: Appl. Phys. 1997, pp. 2478-2481, vol. 30, IOP Publishing Ltd., United Kingdom.
Chuang, S.L. et al., "Enhancement of Smith-Purcell Radiation from a Grating with Surface-Plasmon Excitation," Journal of the Optical Society of America, Jun. 1984, pp. 672-676, vol. 1 No. 6, Optical Society of America.
Chuang, S.L. et al., "Smith-Purcell Radiation from a Charge Moving Above a Penetrable Grating," IEEE MTT-S Digest, 1983, pp. 405-406, IEEE.
Far-IR, Sub-MM & MM Detector Technology Workshop list of manuscripts, session 6 2002.
Feltz, W.F. et al., "Near-Continuous Profiling of Temperature, Moisture, and Atmospheric Stability Using the Atmospheric Emitted Radiance Interferometer (AERI)," Journal of Applied Meteorology, May 2003, vol. 42 No. 5, H.W. Wilson Company, pp. 584-597.
Freund, H.P. et al., "Linearized Field Theory of a Smith-Purcell Traveling Wave Tube," IEEE Transactions on Plasma Science, Jun. 2004, pp. 1015-1027, vol. 32 No. 3, IEEE.
Gallerano, G.P. et al., "Overview of Terahertz Radiation Sources," Proceedings of the 2004 FEL Conference, pp. 216-221.
Goldstein, M. et al., "Demonstration of a Micro Far-Infrared Smith-Purcell Emitter," Applied Physics Letters, Jul. 28, 1997, pp. 452-454, vol. 71 No. 4, American Institute of Physics.
Gover, A. et al., "Angular Radiation Pattern of Smith-Purcell Radiation," Journal of the Optical Society of America, Oct. 1984, pp. 723-728, vol. 1 No. 5, Optical Society of America.
Grishin, Yu. A et al., "Pulsed Orotron—A New Microwave Source for Submillimeter Pulse High-Field Electron Paramagnetic Resonance Spectroscopy," Review of Scientific Instruments, Sep. 2004, pp. 2926-2936, vol. 75 No. 9, American Institute of Physics.
Ishizuka, H. et al., "Smith-Purcell Experiment Utilizing a Field-Emitter Array Cathode: Measurements of Radiation," Nuclear Instruments and Methods in Physics Research, 2001, pp. 593-598, A 475, Elsevier Science B.V.
Ishizuka, H. et al., "Smith-Purcell Radiation Experiment Using a Field-Emission Array Cathode," Nuclear Instruments and Methods in Physics Research, 2000, pp. 276-280, A 445, Elsevier Science B.V.
Ives, Lawrence et al., "Development of Backward Wave Oscillators for Terahertz Applications," Terahertz for Military and Security Applications, Proceedings of SPIE vol. 5070 (2003), pp. 71-82.
Ives, R. Lawrence, "IVEC Summary, Session 2, Sources I" 2002.

Jonietz, Erika, "Nano Antenna Gold nanospheres show path to all-optical computing," Technology Review, Dec. 2005/Jan. 2006, p. 32.

Joo, Youngcheol et al., "Air Cooling of IC Chip with Novel Microchannels Monolithically Formed on Chip Front Surface," Cooling and Thermal Design of Electronic Systems (HTD-vol. 319 & EEP-vol. 15), International Mechanical Engineering Congress and Exposition, San Francisco, CA Nov. 1995 pp. 117-121.

Joo, Youngcheol et al., "Fabrication of Monolithic Microchannels for IC Chip Cooling," 1995, Mechanical, Aerospace and Nuclear Engineering Department, University of California at Los Angeles.

Jung, K.B. et al., "Patterning of Cu, Co, Fe, and Ag for magnetic nanostructures," J. Vac. Sci. Technol, A 15(3), May/Jun. 1997, pp. 1780-1784.

Kapp, Oscar H. et al., "Modification of a Scanning Electron Microscope to Produce Smith-Purcell Radiation," Review of Scientific Instruments, Nov. 2004, pp. 4732-4741, vol. 75 No. 11, American Institute of Physics.

Kiener, C. et al., "Investigation of the Mean Free Path of Hot Electrons in GaAs/AlGaAs Heterostructures," Semicond. Sci. Technol., 1994, pp. 193-197, vol. 9, IOP Publishing Ltd., United Kingdom.

Kim, Shang Hoon, "Quantum Mechnical Theory of Free-Electron Two Quantum Stark Emission Driven by Transverse Motion," Journal of the Physical Society of Japan, Aug. 1993, vol. 62, No. 8, pp. 2528-2532.

Korbly, S.E. et al., "Progress on a Smith-Purcell Radiation Bunch Length Diagnostic," Plasma Science and Fusion Center, MIT, Cambridge, MA.

Kormann, T. et al., "A Photoelectron Source for the Study of Smith-Purcell Radiation".

Kube, G. et al., "Observation of Optical Smith-Purcell Radiation at an Electron Beam Energy of 855 MeV," Physical Review E, May 8, 2002, vol. 65, The American Physical Society, pp. 056501-1-056501-15.

Liu, Chuan Sheng, et al., "Stimulated Coherent Smith-Purcell Radiation from a Metallic Grating," IEEE Journal of Quantum Electronics, Oct. 1999, pp. 1386-1389, vol. 35, No. 10, IEEE.

Manohara, Harish et al., "Field Emission Testing of Carbon Nanotubes for THz Frequency Vacuum Microtube Sources," Abstract. Dec. 2003. from SPIEWeb.

Manohara, Harish M. et al., "Design and Fabrication of a THz Nanoklystron".

Manohara, Harish M. et al., "Design and Fabrication of a THz Nanoklystron" (www.sofia.usra.edu/det_workshop/ poster/session 3/3-43manohara poster.pdf), PowerPoint Presentation.

McDaniel, James C. et al., "Smith-Purcell Radiation in the High Conductivity and Plasma Frequency Limits," Applied Optics, Nov. 15, 1989, pp. 4924-4929, vol. 28, No. 22, Optical Society of America.

Meyer, Stephan, "Far IR, Sub-MM & MM Detector Technology Workshop Summary," Oct. 2002. (may date the Manohara documents).

Makhoff, Nicolas, "Optical-speed light detector promises fast space talk," EETimes Online Mar. 20, 2006, from website: www.eetimes.com/showArticle.jhtml?articleID=183701047.

Nguyen, Phucanh et al., "Novel technique to pattern silver using CF4 and CF4/O2 glow discharges," J. Vac. Sci. Technol. B 19(1), Jan./Feb. 2001, American Vacuum Society, pp. 158-165.

Nguyen, Phucanh et al., "Reactive ion etch of patterned and blanket silver thin films in C12/O2 and O2 glow discharges," J. Vac. Sci, Technol. B. 17 (5), Sep./Oct 1999, American Vacuum Society, pp. 2204-2209.

Ohtaka, Kazuo, "Smith-Purcell Radiation from Metallic and Dielectric Photonic Crystals," Center for Frontier Science, pp. 272-273, Chiba University, 1-33 Yayoi, Inage-ku, Chiba-shi, Japan.

Phototonics Research, "Surface-Plasmon-Enhanced Random Laser Demonstrated," Photonics Spectra, Feb. 2005, pp. 112-113.

Platt, C.L. et al., "A New Resonator Design for Smith-Purcell Free Electron Lasers," 6Q19, p. 296.

Potylitsin, A.P., "Resonant Diffraction Radiation and Smith-Purcell Effect," (Abstract), arXiv: physics/9803043 v2 Apr. 13, 1998.

Potylitsyn, A.P., "Resonant Diffraction Radiation and Smith-Purcell Effect," Physics Letters A, Feb. 2, 1998, pp. 112-116, A 238, Elsevier Science B.V.

S. Hoogland et al., "solution-processed 1.53 μm quantum dot laser with temperature-invariant emission wavelength," Optics Express, vol. 14, No. 8, Apr. 17, 2006, pp. 3273-3281.

Savilov, Andrey V., "Stimulated Wave Scattering in the Smith-Purcell FEL," IEEE Transactions on Plasma Science, Oct. 2001, pp. 820-823, vol. 29 No. 5, IEEE.

Schachter, Levi et al., "Smith-Purcell Oscillator in an Exponential Gain Regime," Journal of Applied Physics, Apr. 15, 1989, pp. 3267-3269, vol. 65 No. 8, American Institute of Physics.

Schachter, Levi, "Influence of the Guiding Magnetic Field on the Performance of a Smith-Purcell Amplifier Operating in the Weak Compton Regime," Journal of the Optical Society of America, May 1990, pp. 873-876, vol. 7, No. 5, Optical Society of America.

Schachter, Levi, "The Influence of the Guided Magnetic Field on the Performance of a Smith-Purcell Amplifier Operating in the Strong Compton Regime," Journal of Applied Physics, Apr. 15, 1990, pp. 3582-3592, vol. 67 No. 8, American Institute of Physics.

Shih, I. et al., "Experimental Investigations of Smith-Purcell Radiation," Journal of the Optical Society of America, Mar. 1990, pp. 351-356, vol. 7, No. 3, Optical Society of America.

Shih, I. et al., "Measurements of Smith-Purcell Radiation," Journal of the Optical Society of America, Mar. 1990, pp. 345-350, vol. 7 No. 3, Optical Society of America.

Swartz, J.C. et al., "THz-FIR Grating Coupled Radiation Source," Plasma Science, 1998. 1D02, p. 126.

Temkin, Richard, "Scanning with Ease Through the Far Infrared," Science New Series, May 8, 1998, p. 854, vol. 280, No. 5365, American Association for the Advancement of Science.

Walsh, J.E., et al., 1999. From website: http://www.ieee.org/organizations/pubs/newsletters/leos/feb99/hot2.htm.

Wentworth, Stuart M. et al., "Far-Infrared Composite Microbolometers," IEEE MTT-S Digest, 1990, pp. 1309-1310.

Yamamoto, N. et al., "Photo Emission From Silver Particles Induced by a High-Energy Electron Beam," Physical Review B, Nov. 6, 2001, pp. 205419-1-205419-9, vol. 64, The American Physical Society.

Yokoo, K. et al., "Smith-Purcell Radiation at Optical Wavelength Using a Field-Emitter Array," Technical Digest of IVMC, 2003, pp. 77-78.

Zeng, Yuxiao et al., "Processing and encapsulation of silver patterns by using reactive ion etch and ammonia anneal," Materials Chemistry and Physics 66, 2000, pp. 77-82.

* cited by examiner

MICROCIRCUIT USING ELECTROMAGNETIC WAVE ROUTING

RELATED APPLICATIONS

The present invention is related to the following co-pending U.S. patent applications, each which is commonly owned with the present application at the time of filing, and the entire contents of each of which are incorporated herein by reference:

1. application Ser. No. 10/917,571, filed on Aug. 13, 2004, entitled "Patterning Thin Metal Film by Dry Reactive Ion Etching";
2. application Ser. No. 11/203,407, filed Aug. 15, 2005, entitled "Method of Patterning Ultra-Small Structures,"
3. application Ser. No. 11/243,476, filed Oct. 5, 2005, entitled, "Structure and Methods for Coupling Energy from an Electromagnetic Wave";
4. application Ser. No. 11/243,477, filed Oct. 5, 2005, entitled, "Electron Beam Induced Resonance";
5. application Ser. No. 11/238,991, filed Sep. 30, 2005, entitled, "Light Emitting Free-Electron Micro Resonant Structure";
6. application Ser. No. 11/302,471, filed Dec. 14, 2005, entitled, "Coupled Nano-Resonating Energy Emitting Structures";
7. application Ser. No. 11/325,432, filed Jan. 5, 2006, entitled, "Resonant Structure-Based Display";
8. application Ser. No. 11/325,448, filed Jan. 5, 2006, entitled, "Selectable Frequency Light Emitter";
9. application Ser. No. 11/325,571, filed Jan. 5, 2006, entitled, "Switching Micro-Resonant Structures by Modulating a Beam of Charged Particles"; and
10. application Ser. No. 11/325,534, filed Jan. 5, 2006, entitled, "Switching Micro-Resonant Structures Using at Least One Director";
11. application Ser. No. 11/400,280, filed Apr. 10, 2006, entitled "Resonant Detector For Optical Signals"; and
12. application Ser. No. 11/418,082, filed May 5, 2006, entitled "Coupling Electromagnetic Wave Through Microcircuit."

COPYRIGHT NOTICE

A portion of the disclosure of this patent document contains material which is subject to copyright or mask work protection. The copyright or mask work owner has no objection to the facsimile reproduction by anyone of the patent document or the patent disclosure, as it appears in the Patent and Trademark Office patent file or records, but otherwise reserves all copyright or mask work rights whatsoever.

FIELD OF THE INVENTION

This relates in general to semiconductor components and, more particularly, to coupling signals throughout semiconductor components using a transparent conductor.

BACKGROUND & INTRODUCTION

Semiconductor manufacturers are constantly striving to keep up with applications that require faster speeds for their microprocessors or microcircuits. For example, at clock speeds greater than three gigahertz, a microcircuit can be required to couple signals to billions of transistors. Further, microcircuits are continuing to be used over a variety of applications requiring faster speed including modeling and simulation, games, and internet video processing. It is anticipated that microcircuits having faster speeds will continue to be designed for a broad range of systems such as highly parallel supercomputers, back-end servers, desktop systems, and a number of embedded applications.

The industry has made tremendous strides in reducing the gate delays within individual devices of a semiconductor component or microcircuit. This improvement in device speed is generally limited by the conductors between the devices. The conductors can include heavily doped semiconductor materials or conductive metal strips and are commonly referred to as metallization. Generally, the microcircuit includes a plurality of alternating layers of conductors and insulators or dielectric layers. The velocity of propagation of a signal through the conductor is a function of conductor delay. The delay typically depends on a number of factors including the type of conductor material, operating frequency, length of the conductor, spacing between conductors and the permittivity of the dielectric layers adjacent to the conductor. In one example, the conductors of a synchronous digital circuit are required to carry the clock pulses to thousands of locations on the microcircuit at precisely the same time. As the clock speeds increase, the conductor delays can result in a loss in synchronization such that the microcircuit cannot function correctly. By changing the conductor material from aluminum to copper, manufacturers have been able to reduce the delay of signals through their microcircuits. Further, manufacturers have reduced the permittivity or dielectric constant of the dielectric layers, thereby reducing the capacitance between the conductor and the dielectric layer. For example, materials such as hydrogen silsesquioxane (HSQ), methyl silsesquioxane (MSQ), fluorinated glass, or NANOGLASS™ can aid in lowering the dielectric constant.

As clock speeds further increase, the signal or clock pulse is not completely contained on the conductor. Instead, a portion of the signal travels through the dielectric layer adjacent to the conductor. This exposes the clock pulse to an inhomogeneous media. The clock pulse generally includes a square wave shape and contains various frequency components. Hence, the clock pulse spreads out, smears or becomes dispersed in time, because the various frequency components travel at different speeds through the inhomogeneous media. As the requirements for speed further increase, any improvement in reducing delays by changing the conductor and dielectric layer materials are limited. Further gains in reducing the delay can include a combination of reducing the conductor's length and increasing the cross-sectional area of the conductor. The costs for changing the geometry of the conductor can include more processing steps and push the limits of the statistical capability of the process.

We describe a structure for coupling a signal through a microcircuit. In one example of such a structure, a transparent, conductive portion is used to couple an electromagnetic wave to various parts of the microcircuit. In another example of such a structure, an insulating layer is used to couple an electromagnetic wave to various parts of the microcircuit.

BRIEF DESCRIPTION OF THE DRAWINGS

The following description, given with respect to the attached drawings, may be better understood with reference to the non-limiting examples of the drawings, wherein.

DETAILED DESCRIPTION OF THE PRESENTLY PREFERRED EXEMPLARY EMBODIMENTS

Figure 1:
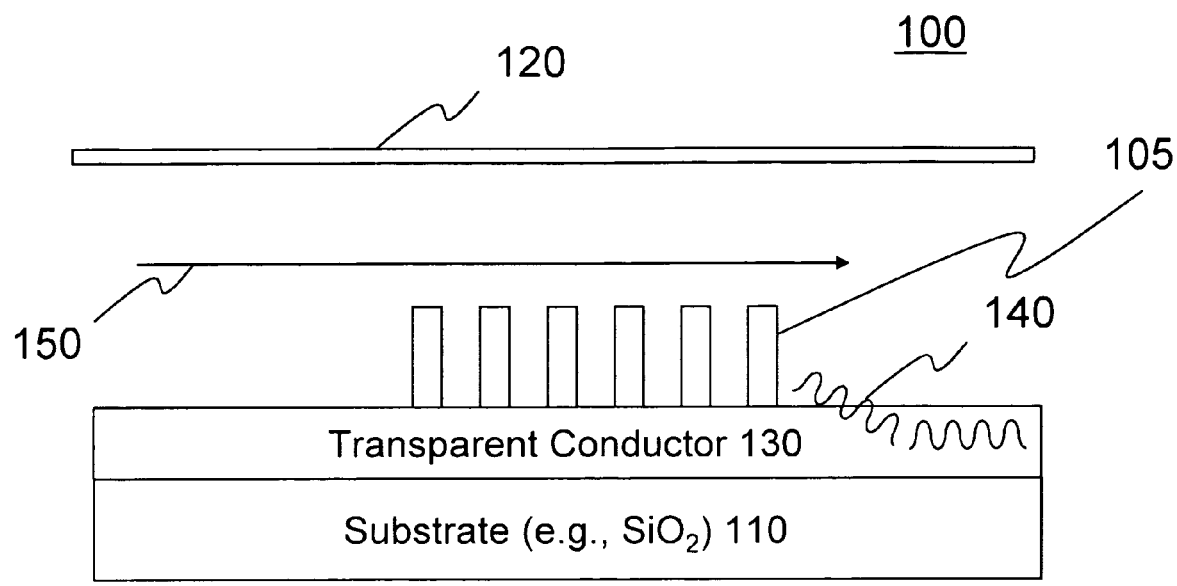
FIG. 1 is a side view of a portion of a microcircuit that includes micro-resonant structures producing electromagnetic radiation which is distributed to portions of the microcircuit through a transparent conductive layer.

FIG. 1 is a side view of a microcircuit 100 in which an ultra-small resonant structure 105 is formed on top of, or otherwise in optical connection with, a transparent conductive layer 130 which itself may be on top of a substrate 110, such as silicon dioxide. Such a configuration may be used in semiconductor devices, liquid panel displays and other devices which are built by layering multiple layers on top of each other and connecting the layers through etching and other known processing steps.

Figure 2:
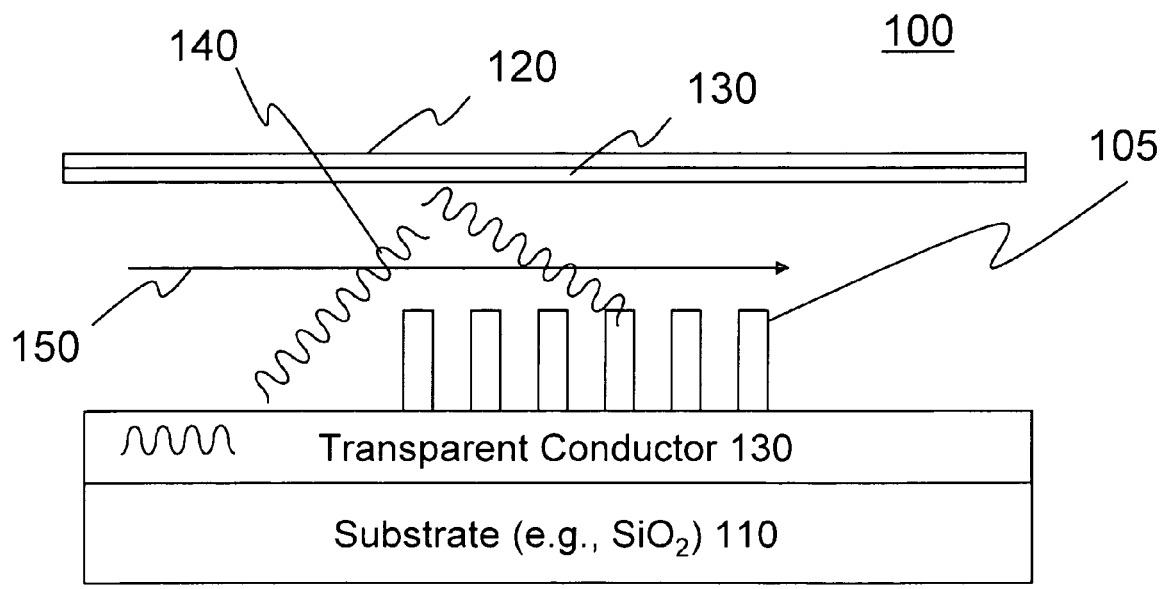
FIG. 2 is a side view of a portion of a microcircuit including a reflective coating such that micro-resonant structures can produce electromagnetic radiation which is distributed to portions of the microcircuit through a transparent conductive layer.

In general, the ultra-small resonant structure is one which emits electro-magnetic radiation (EMR) when exposed to a beam of charged particles. The structure 105 may be, e.g., one or more of the resonant structures described in one or more of the related applications, each of which is described in greater detail above: U.S. application Ser. Nos. 11/243,476; 11/243,477; 11/238,991; 11/302,471; 11/325,432; 11/325,448; 11/325,571; and 11/325,534. The phrase "ultra-small resonant structure" shall mean any structure of any material, type or microscopic size that by its characteristics causes electrons to resonant at a frequency in excess of the microwave frequency. Ultra-small structures encompass a range of structure sizes sometimes described as micro—or nano-sized. Objects with dimensions measured in ones, tens or hundreds of microns are described as micro-sized. Objects with dimensions measiured in ones, tens, or hundreds of nanometers or less are commonly designated nano-sized. Ultra-small hereinafter refers to structures and features ranging in size from hundreds of micrrons in size to ones of nanometers in size. Thus, the ultra-small resonant structure 105 emits an EMR wave 140 into the transparent conductive layer 130, either directly or after reflection off of one or more surfaces. One such surface is a reflective surface 130 (FIG. 2) which may optionally be applied to a surface (interior or exterior) of a hermetic sealing material 120 when the resonant structures 105 are built within a vacuum environment.

As the term is used herein, the structures are considered ultra-small when they embody at least one dimension that is smaller than the wavelength of visible light. The ultra-small structures are employed in a vacuum environment. Methods of evacuating the environment where the beam 150 passes by the structures 105 can be selected from known evacuation methods.

Generally the transparent conductive layer 130 acts as a waveguide. The transparent conductive layer 130 can be made of any material or composition that is amenable to the other processing steps and is transparent and conductive. As would be understood by those of ordinary skill in the art, examples of such materials include indium tin oxide, tin oxide, some ternary oxides and some polysilicon compounds.

Figure 3:
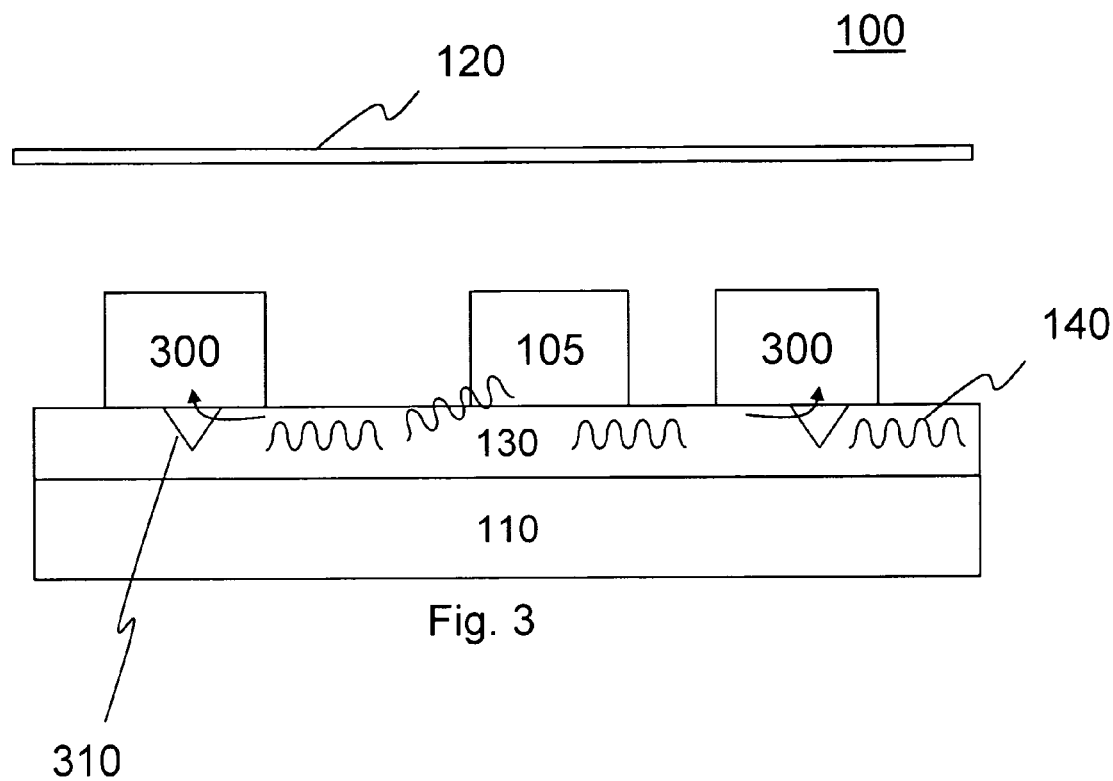
FIG. 3 is a side view of a portion of a microcircuit that includes micro-resonant structures producing electromagnetic radiation and plural circuits receiving the electromagnetic radiation produced by the micro-resonant structures.

As shown in FIG. 3, the electromagnetic radiation 140 generated by the resonant structures 105 can be carried away from the resonant structures 105 by the transparent conductive layer 130 and be delivered to at least one circuit 300. A circuit 300 includes a detector for converting the electromagnetic radiation 140 back into an electrical signal such that it can be used by the circuit 300. One such detector is another resonant structure having dimensions tuned to the frequency of the electromagnetic radiation 140.

The circuit further includes the functional circuitry (e.g., arithmetic, logic, processing or storage) that is intended to receive the signal being produced by the resonant structures 105.

In order to facilitate a coupling of the electromagnetic radiation 140 to at least one circuit 300, the transparent conductive layer 130 may be fabricated to include defects 310. Defects 310 enable a portion of the electromagnetic radiation 140 to be coupled to a corresponding circuit 300 while allowing a different portion of the electromagnetic radiation 140 to continue traveling down the transparent conductive layer 130.

Figure 4:
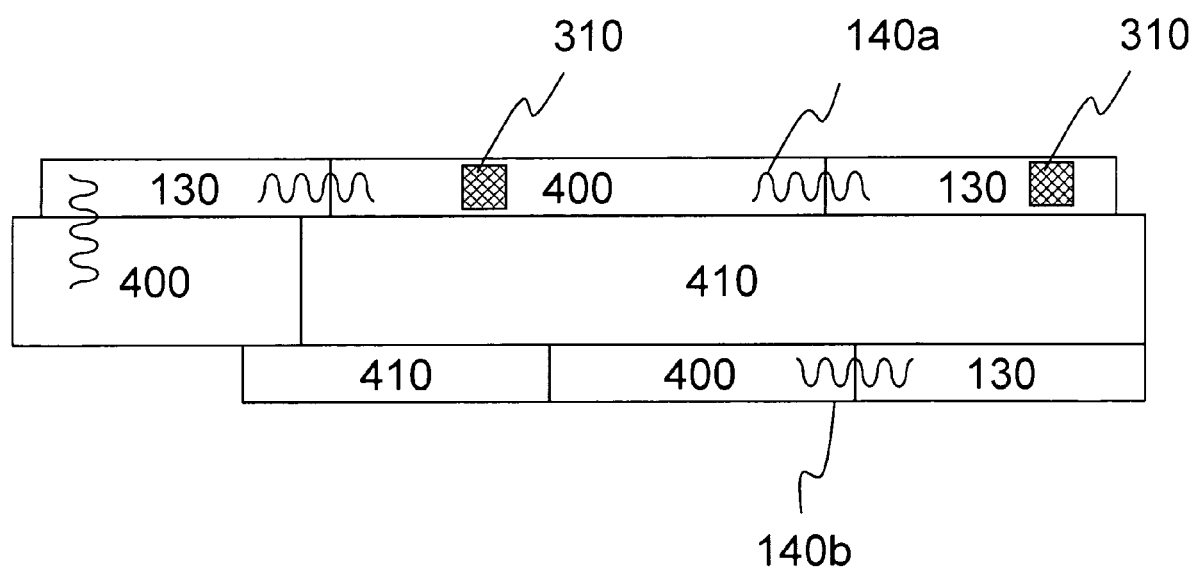
FIG. 4 is a top view of a portion of a microcircuit that includes transparent conductive material, transparent non-conductive material and non-transparent material.

As shown in the top view of FIG. 4, in addition to the electromagnetic radiation 140a being carried in the transparent conductive layer 130, the electromagnetic radiation 140a can also be carried by at least one other transparent, non-conductive layer 400. Accordingly, in situations where the transparent conductive layer 130 does not extend or run to a desired location, the transparent conductive layer 130 may abut another transparent layer 400 and allow the electromagnetic radiation 140a to pass between them. The electromagnetic radiation 140a may then exit the transparent layer 400 directly through defect 310 or may pass back into a different segment of the transparent conductive layer 130 before exiting through defect 310.

Also illustrated in FIG. 4 is at least one non-transparent material 410 that prevents the electromagnetic radiation 140a from passing to areas for which it is not intended. For example, as illustrated the electromagnetic radiation 140a is segregated from other electromagnetic radiation 140b.

Figure 5:
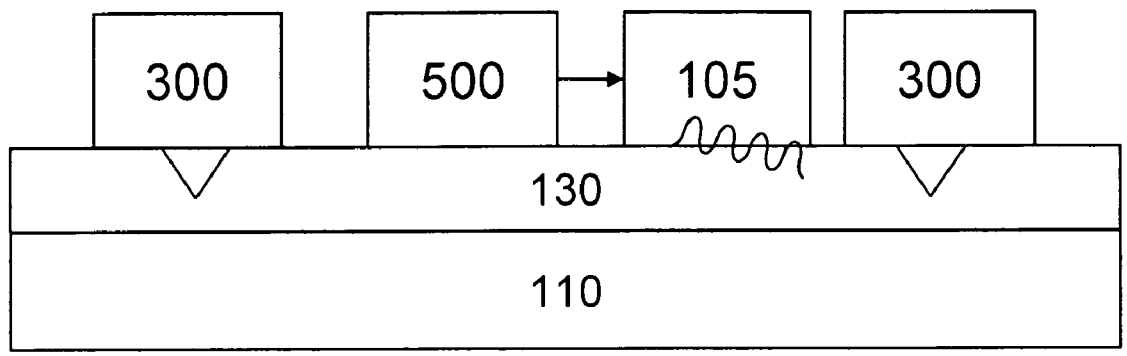
FIG. 5 is a side view of a portion of a microcircuit that includes micro-resonant structures producing electromagnetic radiation acting as a clock signal and plural circuits receiving the electromagnetic clock signal.

The electromagnetic radiation 140 can be used to carry signals of any kind. For example, the electromagnetic radiation 140 can carry clock signals, data signals, address signals and generally input and output signals. In an illustrative embodiment shown in FIG. 5, a controller 500 controls when the resonant structures 105 are turned on and off so as to produce a electromagnetic radiation signal (e.g., a light signal). The resonant structures 105 can be turned on and off by various methods including, but not limited to, (a) starting and stopping the beam of charged particles used to cause the resonant structures 105 to resonate and (b) deflecting the beam of charged particles away from the resonant structures 105 when the resonant structures 105 are to not resonate and leaving the beam of charged particles undeflected when the resonant structures 105 are to resonate.

In the case of a controller 500 that is to act as a clock control circuit, the operation of the controller 500 is dictated by the duty cycle of the clock signal that is to be produced. In a 50% duty cycle clock, an odd series of inverters can be used as the controller 500 such that resonant structures 105 alternate between resonating and not resonating. In a configuration with an alternate duty cycle, a counter circuit may drive the resonant structures 105 so that the resonant structures 105 resonate part of the time (e.g., 25% of the time) and do not resonate the remainder of the time.

The electromagnetic radiation 140 produced by the resonant structures 105 can also be modulated, if desired.

Figure 6:
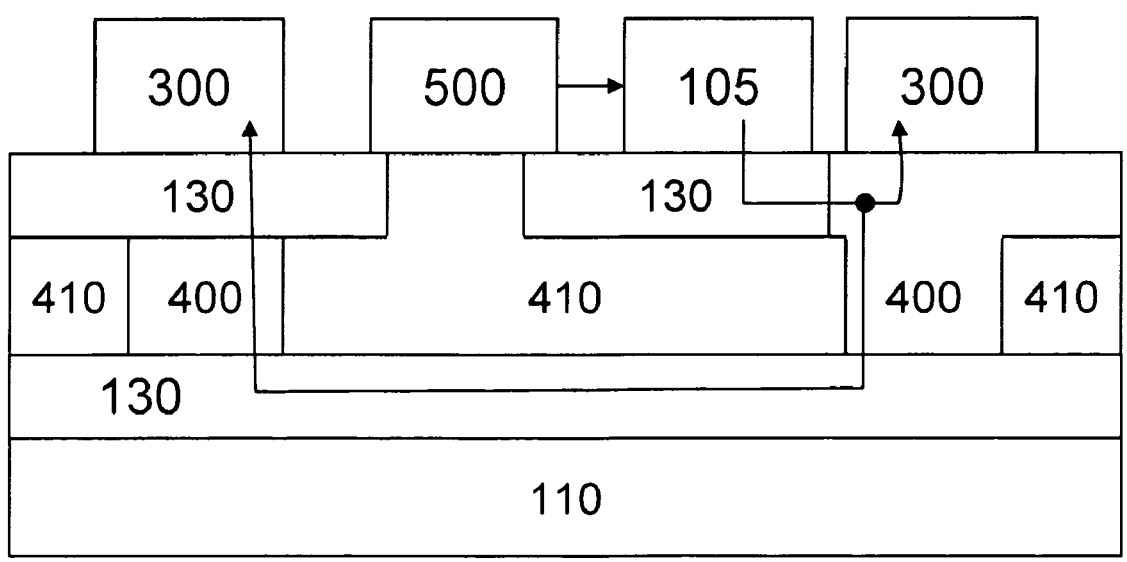
FIG. 6 is a side view of three-dimensional routing of an optical signal in transparent, conductive layers.

In one exemplary structure, a plane (e.g., a power plane or a ground plane) that runs across the entire microcircuit can be used to distribute a signal (e.g., a clock signal) across the entire microcircuit simultaneously. Alternatively, as shown in FIG. 6, signals can be routed three-dimensionally as necessary between various layers of conductive transparent layers 130 and non-conductive transparent layers 400.

Figure 7:
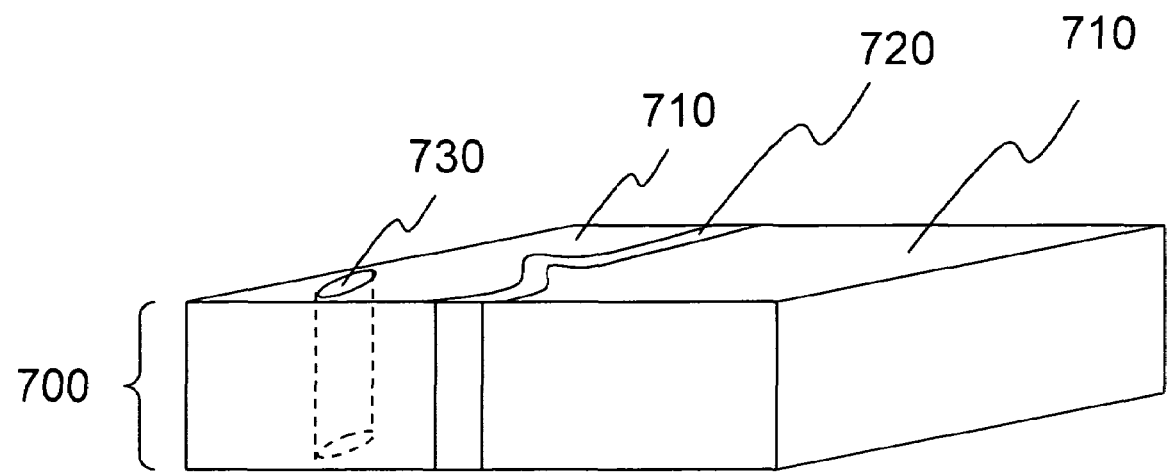
FIG. 7 is a perspective view of a dielectric layer that includes a dielectric material acting as a waveguide within a surrounding dielectric material of a different index of refraction.

As shown in FIG. 7, in yet another embodiment, an insulating layer 700 (such as a dielectric layer that is used between metallization layers in semiconductor devices) includes at least two insulating materials 710 and 720. The first insulating material 710 (e.g., a first dielectric material) surrounds at least a portion of the second insulating material 720 (e.g., a second dielectric material). When the first insulating material 710 has an index of refraction that is greater than the index of refraction of the second insulating material 720, the second insulating material 720 acts as a waveguide for electromagnetic radiation produced by a resonant structure (not shown). As would be appreciated by those of ordinary skill in the art, the layer of the first and second insulating materials may include vias 730 (e.g., to couple a portion of the layer above the insulating layer to a portion of the layer below the insulating layer (e.g., to couple two metallization layers together)).

Figure 8:
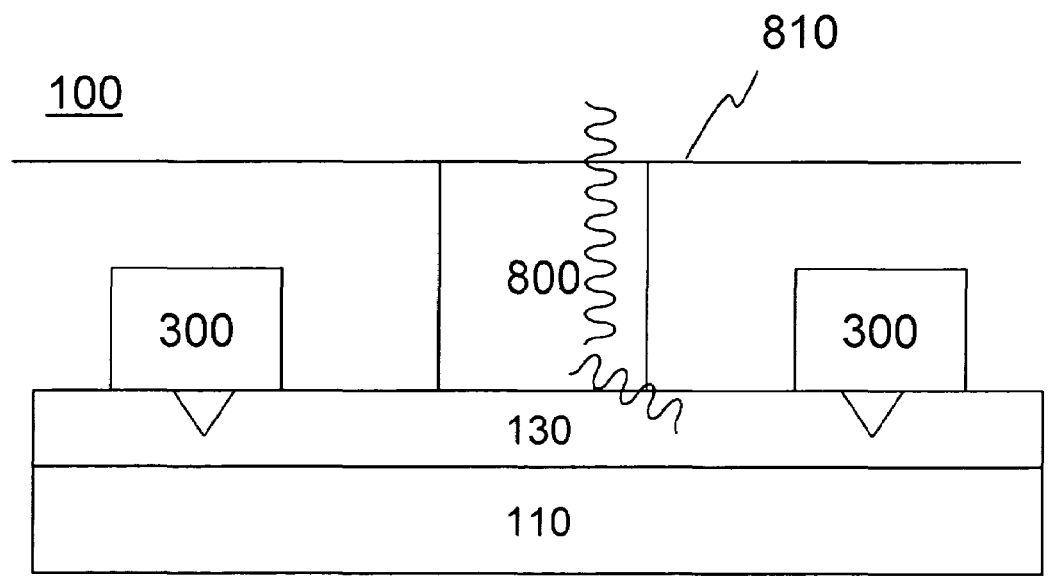
FIG. 8 is a side view of a portion of a microcircuit that includes plural circuits receiving electromagnetic radiation received from an outside of the microcircuit via the transparent conductive layer.
Figure 9:
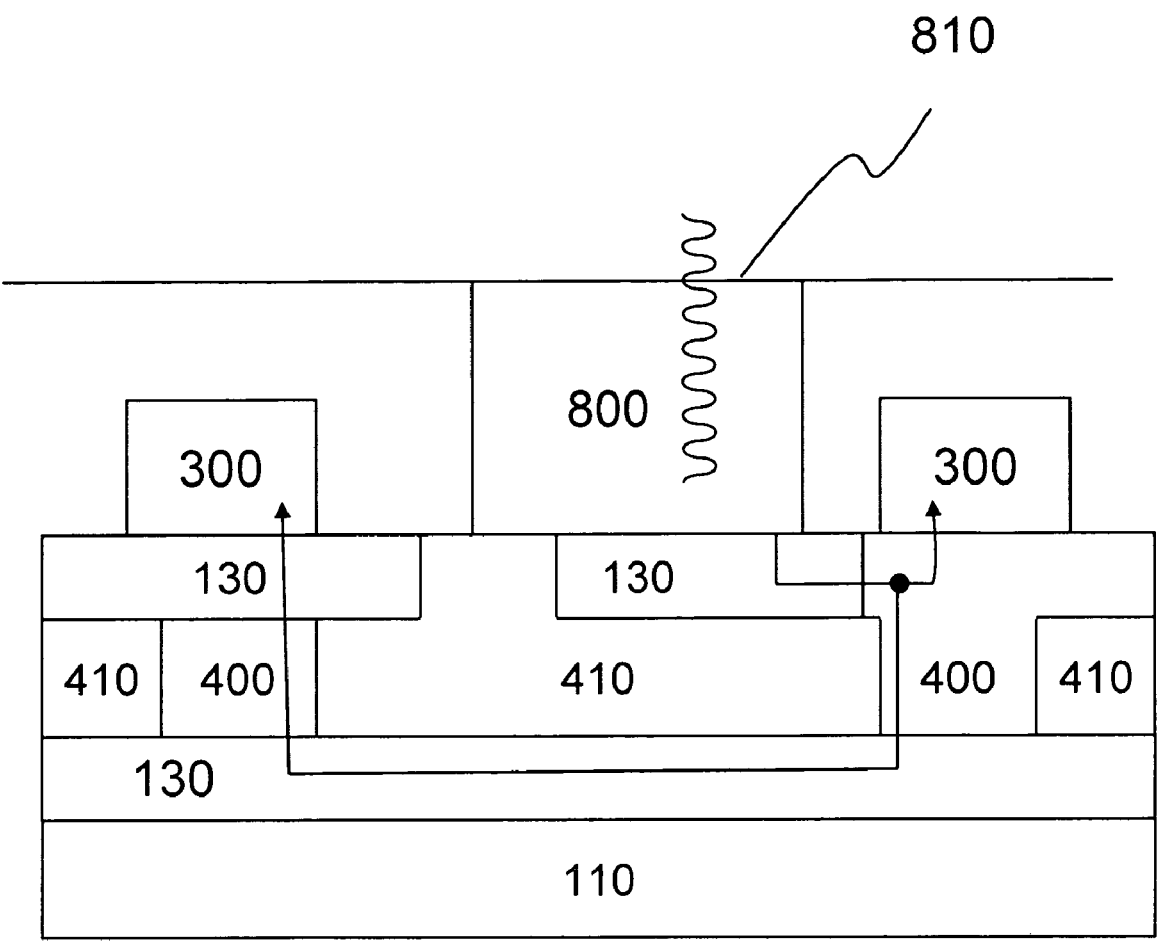
FIG. 9 is a side view of three-dimensional routing of an optical signal, received from off-chip, in transparent, conductive layers.

As shown in FIGS. 8 and 9, a transparent conductive layer 130 can also be used in a configuration in which the electromagnetic radiation 140 is created at an exterior of the integrated circuit 100 (e.g., as created in another integrated circuit or in an external light source such as a laser). In such a configuration, the electromagnetic radiation 140 passes through an exterior 810 of the integrated circuit 100 and into an input region 800. The input region can include any number of materials or voids that allow the electromagnetic radiation 140 to pass through it. Exemplary input regions include a vacuum region, a transparent conductive layer 130 and a transparent non-conductive or dielectric layer. As discussed above with reference to FIGS. 3 and 5, the electromagnetic radiation 140 would then pass into a conductive transparent layer 130 and potentially into other layers on the way to circuits 300 in the integrated circuit 100. In order to allow the electromagnetic radiation 140 to enter the integrated circuit 100, a window or other similar material may be placed above the input region 800.

Figure 10:
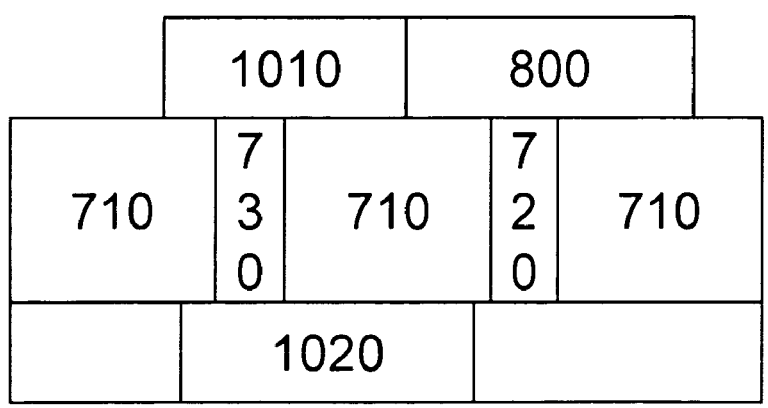
FIG. 10 is a perspective view of a dielectric layer that includes a dielectric material acting as a waveguide within a surrounding dielectric material of a different index of refraction, wherein the electromagnetic radiation traveling in the waveguide is coupled from off-chip.

As shown in FIG. 10, when using plural insulating materials 710 and 720 (as in FIG. 7), an input region 800 can be used to couple electromagnetic radiation 140 from an exterior of an integrated circuit 100 to circuits (such as circuits 300) using the insulating material 720 as a waveguide. As shown, this waveguide insulating material 720 may be in the same general plane as another material 710 and/or vias 730. In one embodiment, those insulating materials 710 and 720 act as an inter-metal dielectric layer and are sandwiched between the metallization planes 1010 and 1020 which (along with the vias 730) create wires running through the circuit.

In another embodiment of the present invention, the insulating materials 710 and/or 720 may be used as the insulator for a silicon-on-insulator integrated circuit. In one such configuration, the waveguide made from the insulating materials 710 and 720 acts as a signal plane capable of carrying one or more signals across the majority of the integrated circuit if not the entirety.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A device comprising:
   an insulating layer acting as a waveguide; and
   at least one circuit optically connected to the insulating layer to receive electromagnetic radiation received from the insulating layer acting as a waveguide, wherein the insulating layer comprises:
   a first dielectric material having a first index of refraction; and
   a second dielectric material surrounding the first dielectric material and having a second index of refraction greater than the first index of refraction.

2. The device as claimed in claim 1, wherein the insulating layer comprises an inter-metal dielectric layer.

3. The device as claimed in claim 1, further comprising an ultrasmall resonant structure constructed and adapted to transmit electromagnetic radiation into the insulating layer acting as a waveguide.

4. The device as claimed in claim 3, further comprising a transparent conductive layer to receive electromagnetic radiation from the insulating layer acting as a waveguide.

5. The device as claimed in claim 3, further comprising a transparent conductive layer to receive electromagnetic radiatiom from the insulating layer, wherein the insulating layer abuts the transparent conductive layer.

6. The device as claimed in claim 3, wherein the electromagnetic radiation carries a clock signal.

7. The device as claimed in claim 3, wherein the insulating layer comprises an inter-metal dielectric layer.

8. The device as claimed in claim 3, wherein the device comprises an integrated circuit.

9. The device as claimed in claim 8, wherein the electromagnetic radiation received from the insulating layer acting as a waveguide is received by the integrated circuit from outside the integrated circuit.

10. The device as claimed in claim 3, wherein the insulating layer is used as the insulator of a silicon on insulated integrated circuit.

11. The device as claimed in claim 1, wherein the device comprises an integrated circuit.

12. The device as claimed in claim 11, wherein the electromagnetic radiation received from the insulating layer acting as a waveguide is received by the integrated circuit from outside the integrated circuit.

13. The device as claimed in claim 1, wherein the insulating layer is used as the insulator of a silicon on insulator integrated circuit.

14. The device as claimed in claim 1, further comprising a transparent conductive layer to receive electromagnetic radiation from the insulating layer acting as a waveguide.

15. The device as claimed in claim 1, further comprising a transparent conductive layer to receive electromagnetic radiation from the insulating layer, wherein the insulating layer abuts the transparent conductive layer.

16. The device as claimed in claim 1, wherein the electromagnetic radiation carries a clock signal.

* * * * *